(12) United States Patent
Lai et al.

(10) Patent No.: US 11,734,434 B2
(45) Date of Patent: Aug. 22, 2023

(54) PROTECTION SYSTEM AND PROTECTION METHOD FOR SOFTWARE AND FIRMWARE OR INFORMATION

(71) Applicants: Yu-Cheng Lai, Hsinchu County (TW); Chia-Yen Lu, Hsinchu County (TW)

(72) Inventors: Yu-Cheng Lai, Hsinchu County (TW); Chia-Yen Lu, Hsinchu County (TW)

(73) Assignee: ECO-LUXURY TECHNOLOGY CO., LTD., Hsinchu County (TW)

(*) Notice: Subject to any disclaimer, the term of this patent is extended or adjusted under 35 U.S.C. 154(b) by 114 days.

(21) Appl. No.: 17/111,370

(22) Filed: Dec. 3, 2020

(65) Prior Publication Data

US 2021/0303702 A1    Sep. 30, 2021

(30) Foreign Application Priority Data

Mar. 30, 2020 (TW) .................. 109110834

(51) Int. Cl.
*G06F 21/60* (2013.01)
*H04L 9/08* (2006.01)

(52) U.S. Cl.
CPC .......... *G06F 21/602* (2013.01); *H04L 9/0822* (2013.01); *H04L 9/0897* (2013.01)

(58) Field of Classification Search
CPC .... G06F 21/602; G06F 21/572; G06F 21/575; G06F 8/61; H04L 9/0822; H04L 9/0897; H04L 9/0894
See application file for complete search history.

(56) References Cited

U.S. PATENT DOCUMENTS

| 2011/0035587 | A1* | 2/2011 | DeVore ............... | H04L 63/0272 713/165 |
| 2014/0082373 | A1* | 3/2014 | Colnot ................. | G06F 21/575 713/193 |
| 2015/0288523 | A1* | 10/2015 | Burghardt ............. | H04L 9/3226 726/20 |
| 2018/0069852 | A1* | 3/2018 | Buendgen ............. | G06F 9/4416 |
| 2019/0087577 | A1* | 3/2019 | Doliwa ................. | G06F 21/44 |
| 2022/0156392 | A1* | 5/2022 | Kataoka ............... | G06F 21/6218 |

* cited by examiner

*Primary Examiner* — Philip J Chea
*Assistant Examiner* — Sangseok Park
(74) *Attorney, Agent, or Firm* — Che-Yang Chen; Law Office of Michael Chen

(57) ABSTRACT

A protection system and a protection method for software and firmware or information capable of encrypting and adding software and firmware or information to an electronic component, so that the software and firmware or the information is protected during the process of adding to the electronic component at a manufacturing end. Even if the encrypted software and firmware or information is obtained, the original content thereof cannot be acquired. When the electronic component is activated and used, the software and firmware or the information stored therein is then decrypted. In this way, the software and firmware or the information in the electronic component can be protected from being stolen, and the cost of the electronic component can be reduced and is easy to promote.

4 Claims, 14 Drawing Sheets

US 11,734,434 B2

PROTECTION SYSTEM AND PROTECTION METHOD FOR SOFTWARE AND FIRMWARE OR INFORMATION

BACKGROUND OF THE INVENTION

Field of Invention

The present invention relates to the technical field of software and firmware or information protection, and more particularly to a protection system and a protection method for software and firmware or information capable of encrypting and adding software and firmware or information to an electronic component and decrypting the software and firmware or the information when the electronic component is used.

Related Art

In order to execute data operating and processing in an electronic device, a large number of integrated circuit chips need to be installed. Commercial integrated circuit chips can be roughly divided into two types, one is a chip without protection function, and the other is a chip with software or firmware protection function. Chips without protection function have poor security, and internal firmware or software can be easily stolen, resulting in the leakage of business secrets. Costs of chips with protection function are relatively higher and not easy to promote.

SUMMARY OF THE INVENTION

In view of this, an object of the present invention is to provide a protection system and a protection method for software and firmware or information capable of encrypting and adding software and firmware or information to an electronic component, so that the software and firmware or the information is protected during the process of adding to the electronic component at a manufacturing end. Even if the encrypted software and firmware or information is obtained, the original content thereof cannot be acquired. When the electronic component is activated and used, the software and firmware or the information stored therein is then decrypted. In this way, the software and firmware or the information in the electronic component can be protected from being stolen, and the cost of the electronic component can be reduced and is easy to promote.

The protection system for software and firmware or information of the present invention includes a first module and a second module. The second module can have arithmetic capability or does not have arithmetic capability. The firmware or the information is encrypted with an information key by an encryptor, and then the encryptor generates a transfer key with the encrypted firmware or information by using a computation program, and encrypts the information key with the transfer key.

For the second module with arithmetic capability, the computation program is sent to the second module, the encrypted firmware or information and the encrypted information key are added to the first module, when the first module is activated, the encrypted firmware or information and the encrypted information key are sent to the second module, the second module decrypts the encrypted information key with the computation program, and then decrypts the encrypted firmware or information with the decrypted information key, and sends the decrypted firmware or information back to the first module for use by the first module.

For the second module with no arithmetic capability, the encrypted firmware or information, the encrypted information key and the computation program are added to the first module, the first module decrypts the encrypted information key with the computation program, and then sends the information key and the encrypted firmware or information to the second module. The second module decrypts the encrypted firmware or information with the information key, and the second module sends the decrypted firmware or information back to the first module for use by the first module.

DETAILED DESCRIPTION OF THE INVENTION

Figure 1:
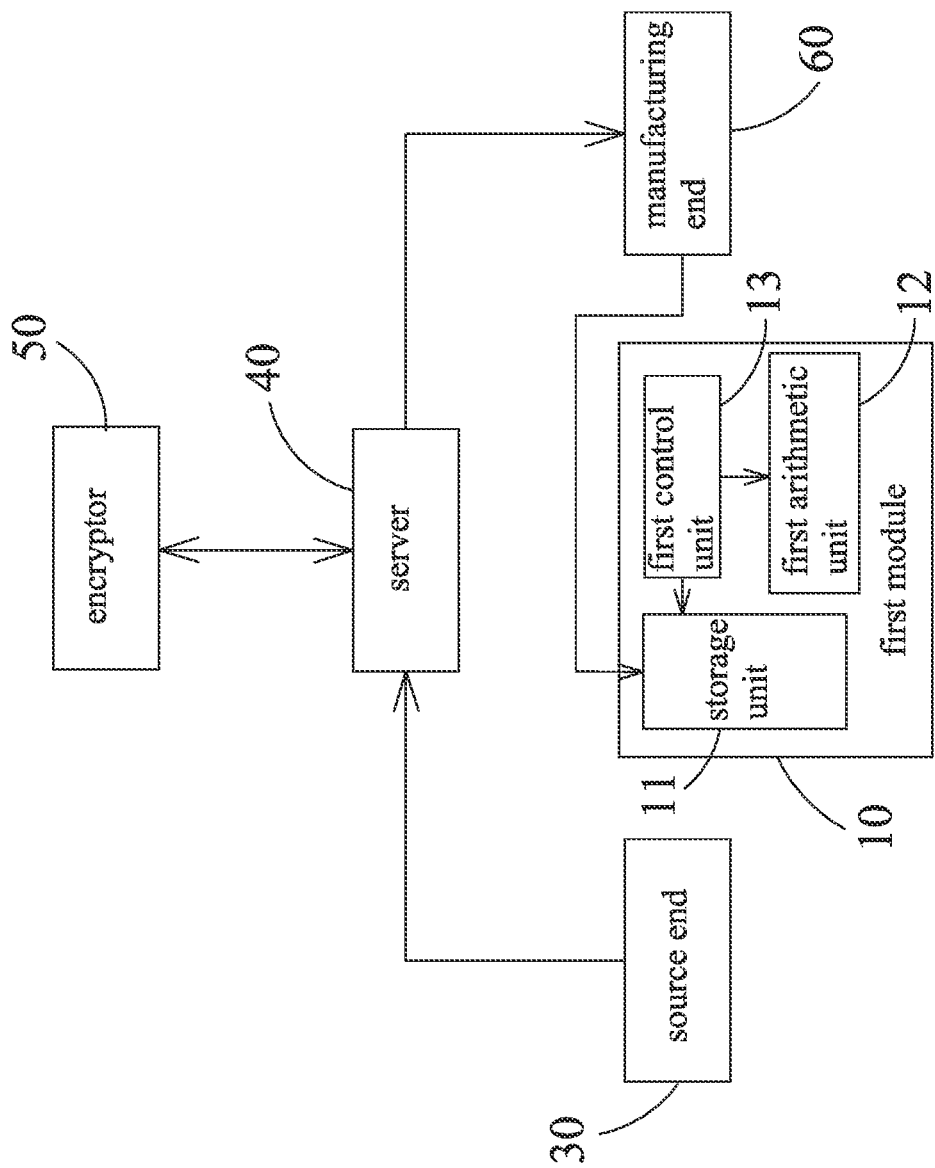
FIG. 1 is a block diagram of one embodiment of a protection system for software and firmware or information of the present invention encrypting software and firmware or information.
Figure 2:
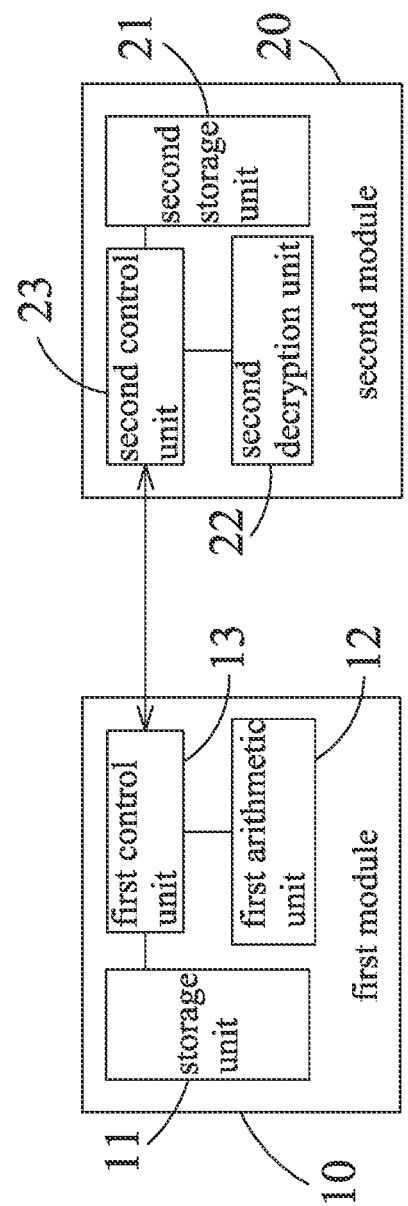
FIG. 2 is a block diagram of one embodiment of the protection system for software and firmware or information of the present invention decrypting software and firmware or information.

Please refer to FIG. 1 and FIG. 2 for one embodiment of a protection system for software and firmware or information of the present invention. A protection system for software and firmware or information 100 of this embodiment includes a first module and a second module 20. The first module 10 includes a first storage unit 11, a first arithmetic unit 12, and a first control unit 13. The first storage unit 11 is used to store a software and firmware program or an information F, the first arithmetic unit 12 is used to use, operate or process the software and firmware program or the information F, and the first control unit 13 is used to control operation of the first storage unit 11 and the first arithmetic unit 12. The second module 20 has capability of preventing external intrusion or operating securely, and includes a second storage unit 21, a second decryption unit 22, and a second control unit 23. The second storage unit 21 is used to store an information key, the second decryption unit 22 uses the information key to decrypt the software and firmware program or the information, and the second control unit 23 is used to control operation of the second storage unit 21 and the second decryption unit 22. The first control unit 13 further controls communication between the first module 10 and the second module 20, and the second control unit 23 further controls communication between the second module 20 and the first module 10.

As shown in FIG. 1, the protection system for software and firmware or information 100 of this embodiment further includes a source end 30, a server 40, an encryptor 50 and a manufacturing end 60. The source end 30 can be a database or a storage device of a software and firmware design company. Software and firmware programs or information designed by the software and firmware company can be sent from the source end 30 to the server 40, transfer of information or data can be performed between the server 40 and the encryptor 50, the server 40 can send the information or data to the manufacturing end 60, and the manufacturing end 60 can be, for example, a burner of a manufacturing plant, capable of burning software and firmware or information into the first module 10.

The first module 10 can be an integrated circuit chip or other electronic components, the first storage unit 11 of the first module 10 can be a memory in an electronic component, the first arithmetic unit 12 can be an application program or a circuit capable of executing operations, and the first control unit 13 can be a processor for accessing information of the first storage unit 11 or starting the first arithmetic unit 12 to perform operations. The second module 20 can be a security module, and the second storage unit 21 can be a memory. When the first module 10 is started to operate, the first module 10 is connected to the second module 20, and the encrypted software and firmware program or information stored in the first storage unit 11 of the first module 10 can be decrypted by the second module 20 and then sent back to the first module 10, so that the first module 10 can execute or read the decrypted software and firmware program or information to generate a predetermined function.

Figure 3:
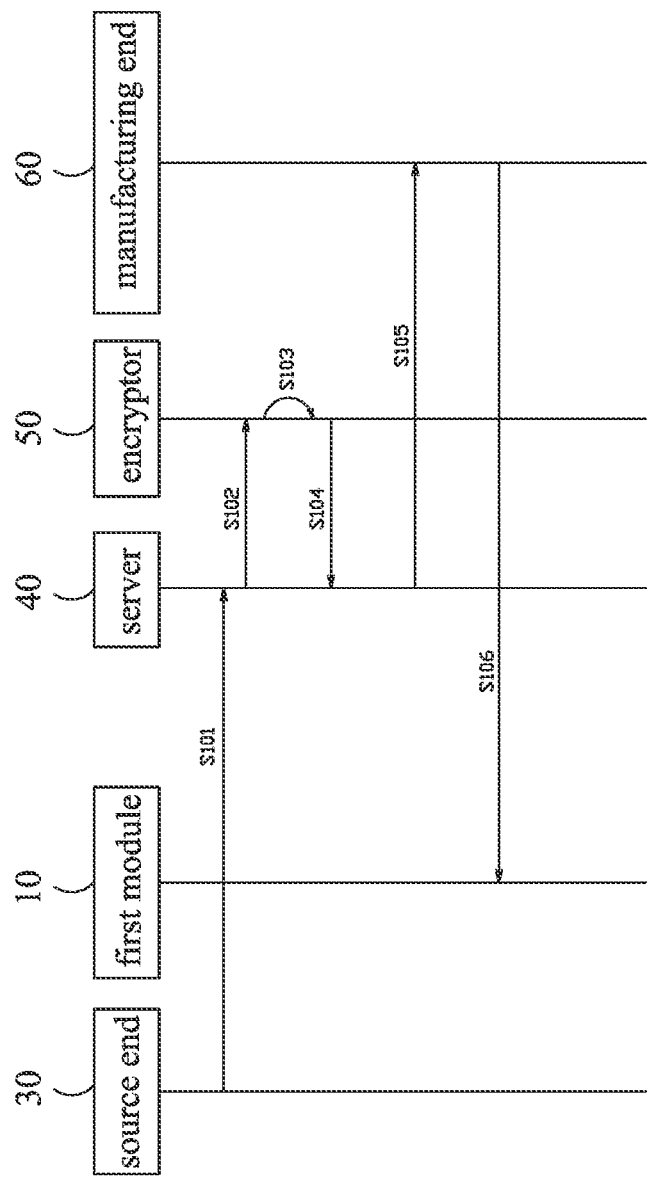
FIG. 3 is a schematic diagram of one embodiment of a protection method for software and firmware or information of the present invention encrypting software and firmware or information.
Figure 4:
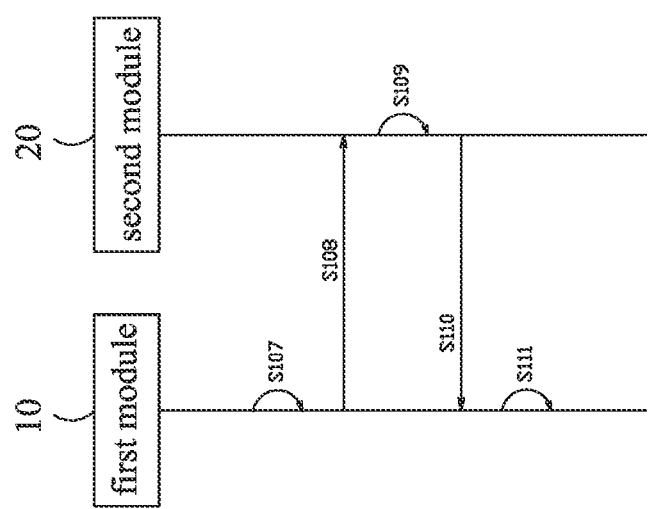
FIG. 4 is a schematic diagram of one embodiment of the protection method for software and firmware or information of the present invention decrypting software and firmware or information.
Figure 5:
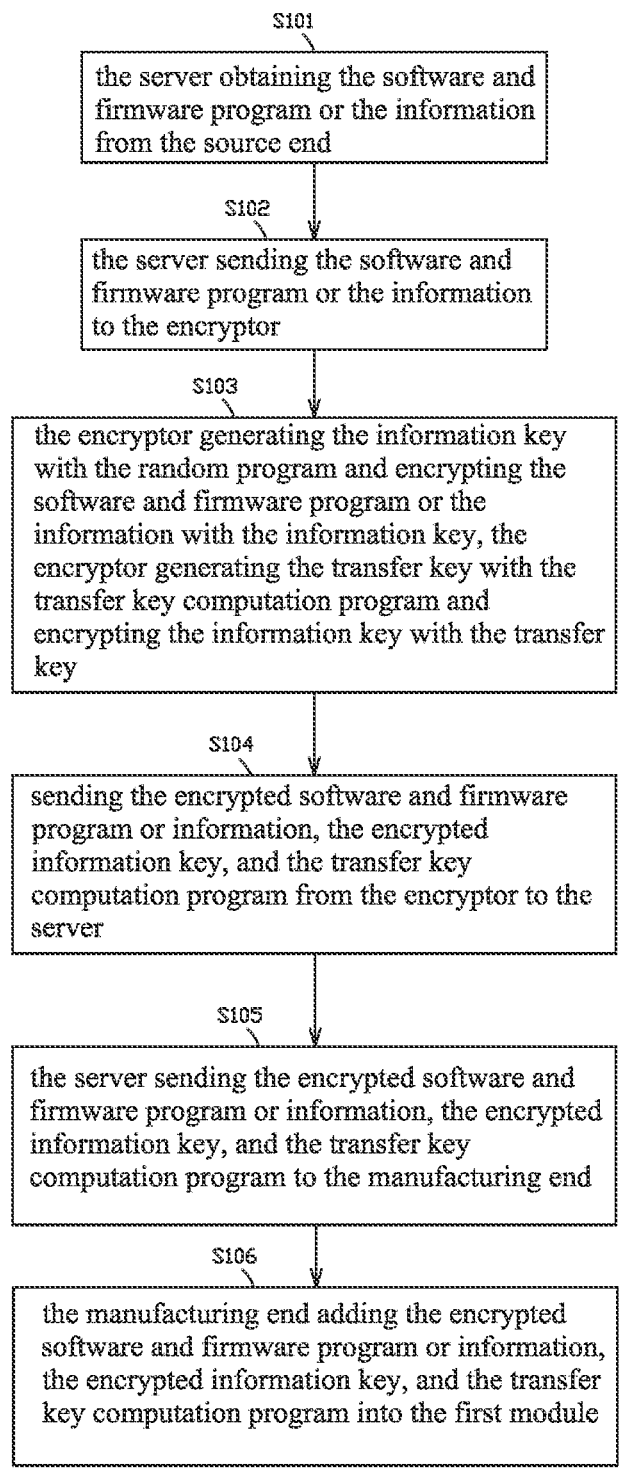
FIG. 5 is a flowchart of the protection method for software and firmware or information of FIG. 3 encrypting software and firmware or information.
Figure 6:
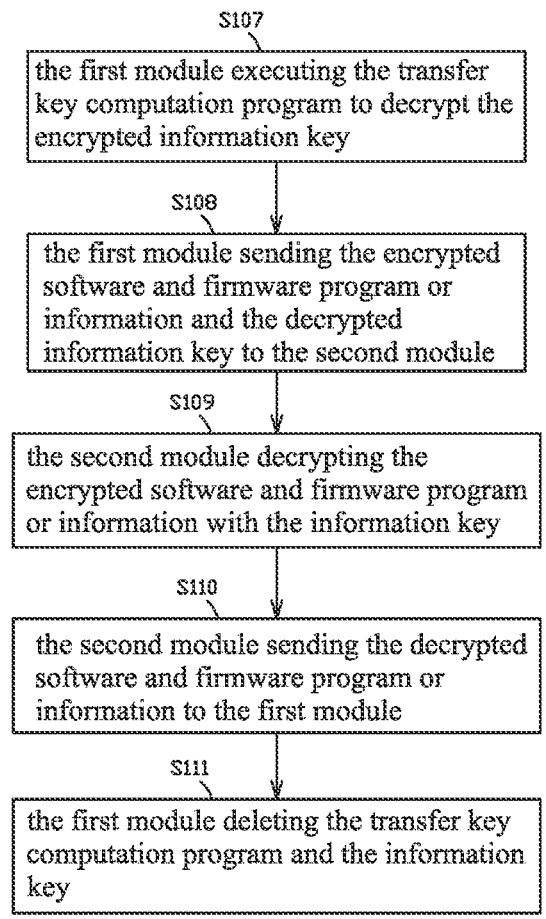
FIG. 6 is a flowchart of the protection method for software and firmware or information of FIG. 4 decrypting software and firmware or information.

Please refer to FIG. 3 to FIG. 6 for one embodiment of a protection method for software and firmware or information of the present invention. As shown in FIGS. 3 and 5, firstly, in step S101, the server 40 obtaining a software and firmware program or an information from the source end 30, for example, the server 40 obtaining the software and firmware program or the information of the source end 30 through a dedicated line or a network;

then, in step S102, the server 40 sending the software and firmware program or the information to the encryptor 50;

then, in step S103, the encryptor 50 generating an information key with a random program, and encrypting the software or firmware program or the information with the information key, the random program generating the information key according to a randomly generated random number, the encryptor 50 using the encrypted software or firmware program or information to make a transfer key computation program to generate a transfer key, and then the encryptor 50 encrypting the information key with the transfer key;

then, in step S104, the server 40 obtaining the encrypted software and firmware program or information, the encrypted information key, and the transfer key computation program from the encryptor 50;

then, in step S105, the server 40 sending the encrypted software and firmware program or information, the encrypted information key, and the transfer key computation program to the manufacturing end 60 (burner);

then, in step S106, the manufacturing end 60 (burner) burning the encrypted software and firmware program or information, the encrypted information key, and the transfer key computation program into the first storage unit 11 of the first module 10;

as shown in FIGS. 4 and 6, when the first module 10 is activated, the first module 10 is connected to the second module 20; then, in step S107, the first arithmetic unit 12 using the encrypted software and firmware program or information of the first storage unit 11 to make the transfer key computation program to generate a transfer key, and decrypting the encrypted information key into the information key by using the transfer key; the transfer key computation program can be different corresponding to different types of the first module 10, that is, the transfer key computation program can be different corresponding to different integrated circuit chips;

then, in step S108, the first module 10 sending the information key and the encrypted software and firmware program or information to the second module 20, and storing the information key and the encrypted software and firmware program or information in the second storage unit 21;

then, in step S109, the second decryption unit 22 decrypting the encrypted software and firmware program or information by using the information key to obtain the decrypted software and firmware program or information;

then, in step S110, sending the decrypted software and firmware program or information from the second module 20 to the first module 10 and storing the decrypted software and firmware program or information in the first storage unit 11; and then, in step S111, the first module 10 deleting the information key and the transfer key computation program from the first storage unit 11.

Since the second module 20 corresponding to the first module 10 does not have operation function, in addition to the encrypted software and firmware program or information, the encrypted information key, and the transfer key computation program being burned into the first module 10 together, when the encrypted information key needs to be decrypted, the first arithmetic unit 12 of the first module 10 can execute the transfer key computation program to decrypt the encrypted information key.

Figure 7:
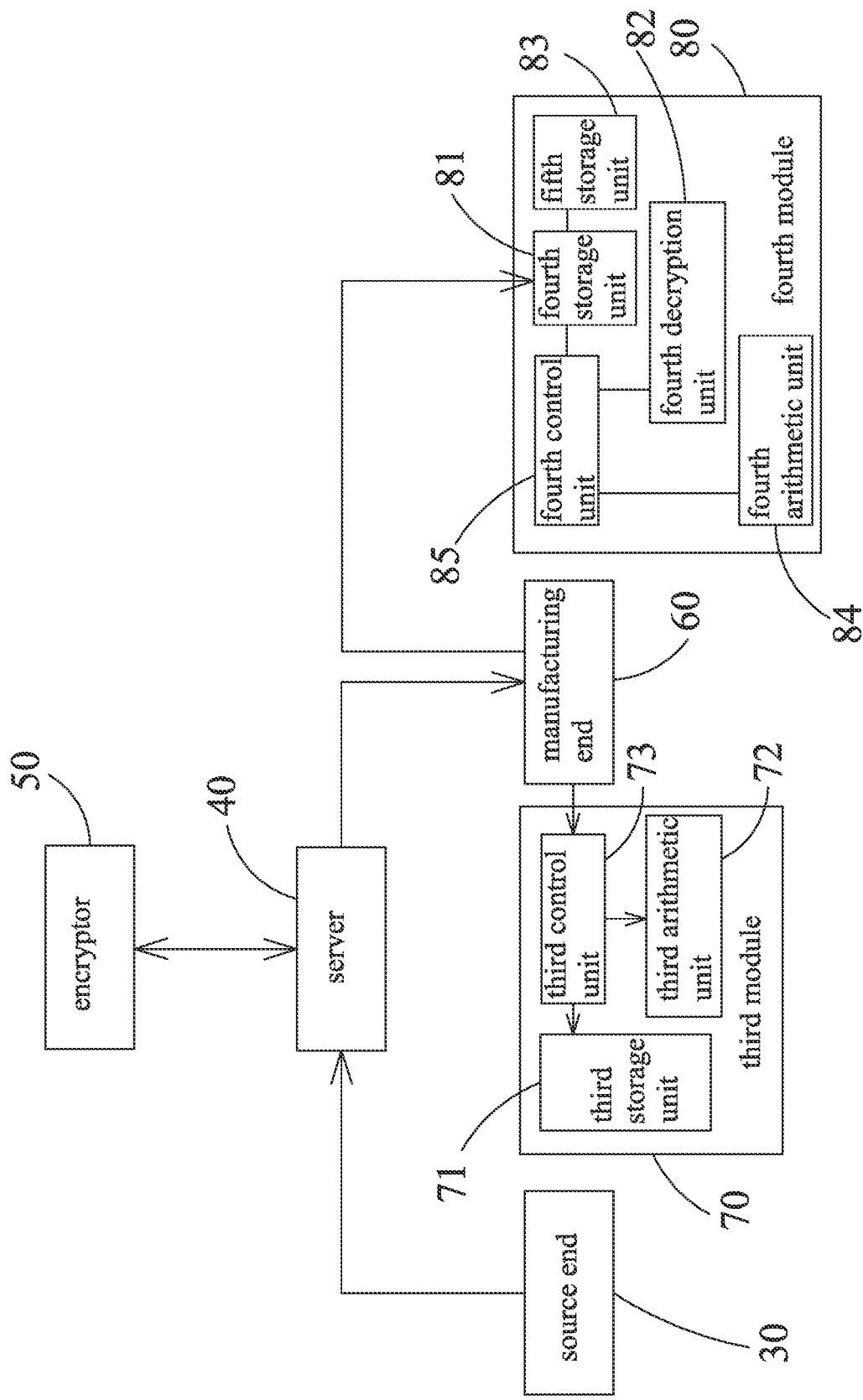
FIG. 7 is a block diagram of another embodiment of the protection system for software and firmware or information of the present invention encrypting software and firmware or information.
Figure 8:
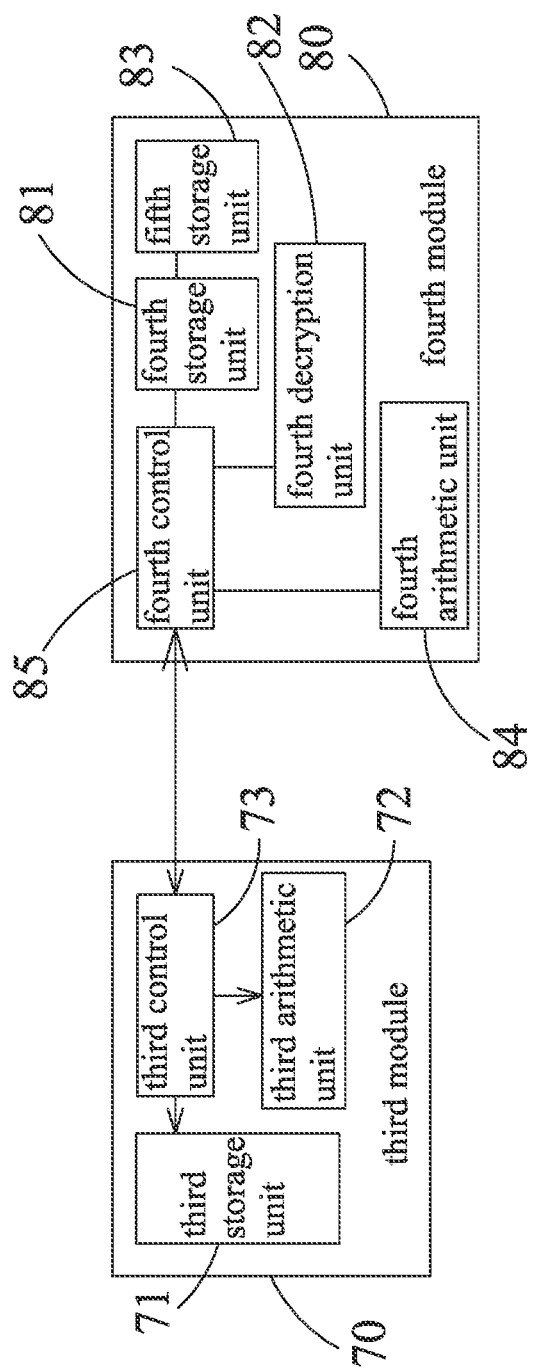
FIG. 8 is a block diagram of another embodiment of the protection system for software and firmware or information of the present invention decrypting software and firmware or information.

Please refer to FIGS. 7 and 8 for another embodiment of the protection system for software and firmware or information of the present invention. A protection system for software and firmware or information 200 of this embodiment includes a third module 70 and a fourth module 80. The third module 70 includes a third storage unit 71, a third arithmetic unit 72, and a third control unit 73. The third storage unit 71 is used to store a software and firmware program or an information, the third arithmetic unit 72 is used to use, operate or process the software and firmware program or the information, and the third control unit 73 is used to control the third storage unit 71 and the third arithmetic unit 72. The fourth module 80 has capability of preventing external intrusion or operating securely, and includes a fourth storage unit 81, a fourth decryption unit 82, a fifth storage unit 83, a fourth arithmetic unit 84, and a fourth control unit 85. The fourth storage unit 81 is used to store an information key, and the fourth decryption unit 82 uses the information key to decrypt the software and firmware program or the information. The fifth storage unit 83 is used to store a software and firmware program or an information. The fourth arithmetic unit 84 is used to use, operate or process the software and firmware program or the information. The fourth control unit 85 is used to control operation of the fourth storage unit 81, the fourth decryption unit 82, the fifth storage unit 83, and the fourth arithmetic unit 84. The third control unit 73 further controls communication between the third module 70 and the fourth module 80, and the fourth control unit 85 further controls communication between the fourth module 80 and the third module 70.

In this embodiment, the source end 30, the server 40, the encryptor 50, and the manufacturing end 60 are the same as those of the embodiment shown in FIG. 1, and thus will not be repeated here. The difference between this embodiment and the embodiment of FIGS. 1 to 6 is that the fourth module 80 of this embodiment has arithmetic capability, so operation of decryption is performed in the fourth module 80.

Figure 9:
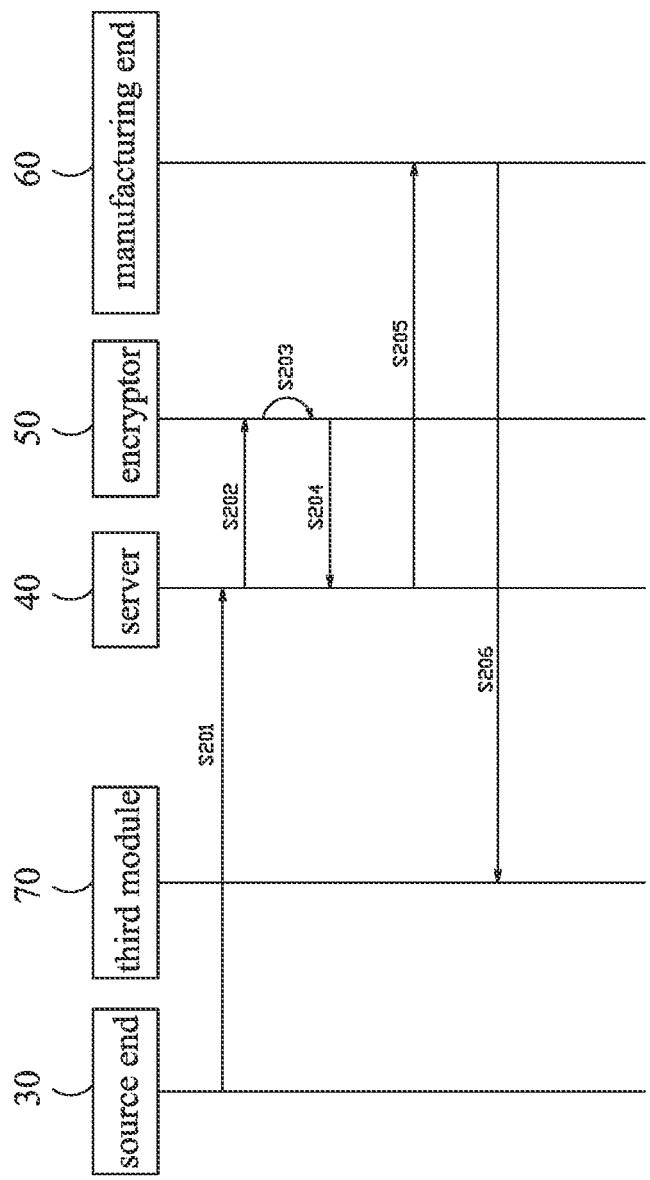
FIG. 9 is a schematic diagram of another embodiment of the protection method for software and firmware or information of the present invention encrypting software and firmware or information.
Figure 10:
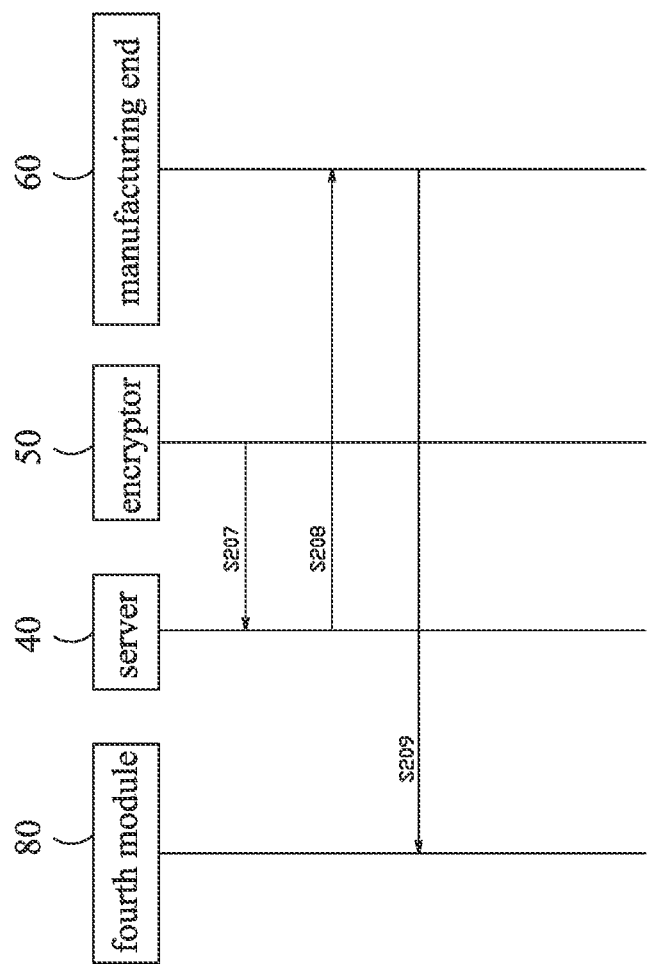
FIG. 10 is a schematic diagram of the protection method for software and firmware or information of the present invention sending a transfer key computation program to a fourth module.
Figure 11:
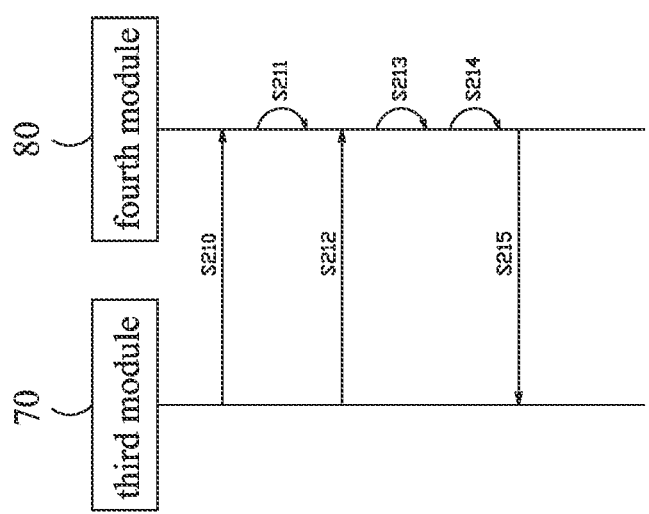
FIG. 11 is a schematic diagram of another embodiment of the protection method for software and firmware or information of the present invention decrypting software and firmware or information.
Figure 12:
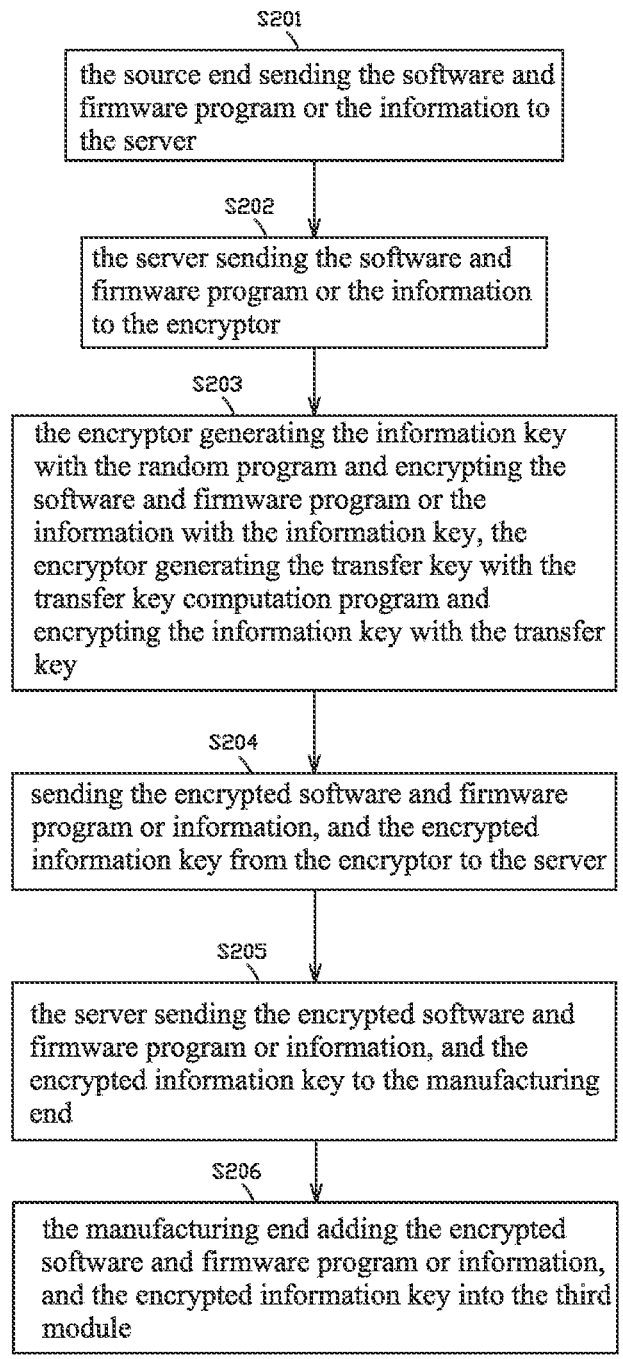
FIG. 12 is a flowchart of the protection method for software and firmware or information of FIG. 9 encrypting software and firmware or information.
Figure 13:
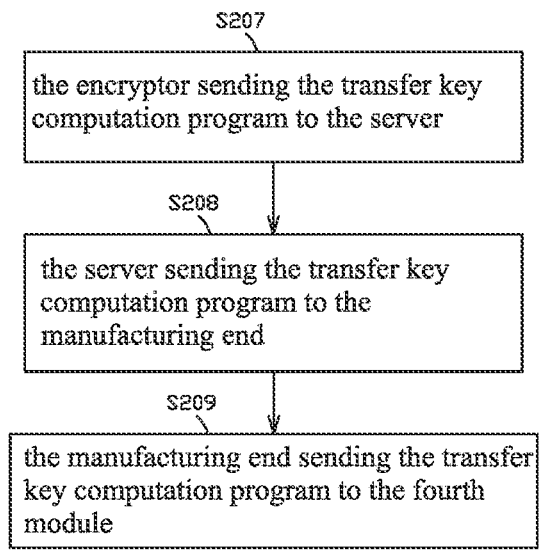
FIG. 13 is a flowchart of the protection method for software and firmware or information of FIG. 10 sending the transfer key computation program to the fourth module.
Figure 14:
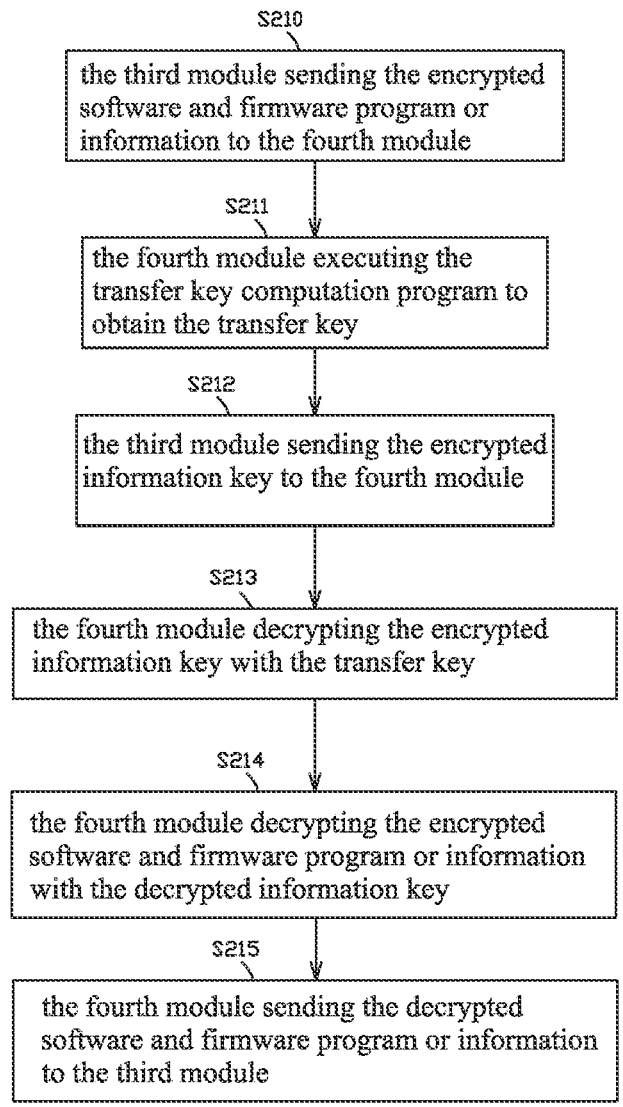
FIG. 14 is a flowchart of the protection method for software and firmware or information of FIG. 11 decrypting software and firmware or information.

Please refer to FIG. 9 to FIG. 14 for another embodiment of the protection method for software and firmware or information of the present invention. As shown in FIG. 9, firstly, in step S201, the server 40 obtaining a software and firmware program or an information from the source end 30, for example, the server 40 obtaining the software and firmware program or the information of the source end 30 through a dedicated line or a network;

then, in step S202, the server 40 sending the software and firmware program or the information to the encryptor 50;

then, in step S203, the encryptor 50 generating an information key with a random program, and encrypting the software or firmware program or the information with the generated information key, the random program generating the information key according to a randomly generated random number, the encryptor 50 using the encrypted software or firmware program or information to make a transfer key computation program to generate a transfer key, and then the encryptor 50 encrypting the information key with the transfer key;

then, in step S204, the server 40 obtaining the encrypted software and firmware program or information, and the encrypted information key from the encryptor 50;

then, in step S205, the server 40 sending the encrypted software and firmware program or information, and the encrypted information key to the manufacturing end 60 (burner);

then, in step S206, the manufacturing end 60 (burner) burning the encrypted software and firmware program or information, the encrypted information key, and the transfer key computation program into the third storage unit 71 of the third module 70;

as shown in FIGS. 10 and 13, then in step S207, the server 40 obtaining the transfer key computation program from the encryptor 50;

then, in step S208, the server 40 sending the transfer key computation program to the manufacturing end 60 (burner);

then, in step S209, the manufacturing end 60 (burner) burning the transfer key computation program into the fifth storage unit 83 of the fourth module 80;

as shown in FIGS. 11 and 14, then in step S210, the third module 70 sending the encrypted software and firmware program or information to the fourth module 80;

then, in step S211, the fourth arithmetic unit 84 generating a transfer key with the encrypted software and firmware program or information and by using the transfer key computation program;

then, in step S212, the third module 70 sending the encrypted information key to the fourth module 80;

then, in step S213, the fourth decryption unit 82 using the transfer key to decrypt the encrypted information key into an information key, and storing the information key in the fourth storage unit 81;

then, in step S214, the fourth decryption unit 82 decrypting the encrypted software and firmware program or information with the decrypted information key; and then, in step S215, sending the decrypted software and firmware program or information from the fourth module 80 to the third module 70 and storing the decrypted software and firmware program or information in the third storage unit 71.

The protection system and the protection method for software and firmware or information of the present invention are capable of encrypting and adding software and firmware or information to an electronic component, so that the software and firmware or the information is protected during the process of burning into the electronic component at the manufacturing end. Even if the encrypted software and firmware or information is obtained, the original content thereof cannot be acquired. When the electronic component is activated and used, the software and firmware or the information stored therein is then decrypted. In this way, the software and firmware or the information in the electronic component can be protected from being stolen, and the cost of the electronic component can be reduced and is easy to promote.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A protection method for software and firmware or information including:

a server obtaining a software and firmware program or an information from a source end;

the server sending the software and firmware program or the information to an encryptor; the encryptor generating an information key;

the encryptor using the information key to encrypt the software and firmware program or the information into an encrypted software and firmware program or information;

the encryptor using the encrypted software or firmware program or information to make a transfer key computation program to generate a transfer key;

the encryptor using the transfer key to encrypt the information key into an encrypted information key;

the server obtaining the encrypted software and firmware program or information, the encrypted information key, and the transfer key computation program from the encryptor;

the server sending the encrypted software and firmware program or information, the encrypted information key, and the transfer key computation program to a burner;

the burner burning the encrypted software and firmware program or information, the encrypted information key, and the transfer key computation program into the first storage unit of a first module;

the first arithmetic unit using the encrypted software and firmware program or information of the first storage unit to make the transfer key computation program to generate the transfer key, and decrypting the encrypted information key into the information key by using the transfer key;

the first module sending the information key to a second module, and storing the information key in the second storage unit; and the first control unit deleting the transfer key computation program and the information key of the first storage unit.

2. The protection method for software and firmware or information as claimed in claim 1, wherein after the information key is sent to the second module, the first control unit deletes the encrypted information key of the first storage unit.

3. A protection method for software and firmware or information including:

a server obtaining a software and firmware program or an information from a source end;

the server sending the software and firmware program or the information to an encryptor;

the encryptor generating an information key;

the encryptor using the information key to encrypt the software and firmware program or the information into an encrypted software and firmware program or information;

the encryptor using the encrypted software or firmware program or information to make a transfer key computation program to generate a transfer key;

using the transfer key to encrypt the information key into an encrypted information key;

the server obtaining the encrypted software and firmware program or information, and the encrypted information key from the encryptor;

the server sending the encrypted software and firmware program or information, and the encrypted information key to a burner;

the burner burning the encrypted software and firmware program or information, and the encrypted information key into the third storage unit of the third module;

the server obtaining the transfer key computation program from the encryptor;

the server sending the transfer key computation program to a burner;

the burner burning the transfer key computation program into the fifth storage unit of a fourth module;

the third module sending the encrypted software and firmware program or information to the fourth module;

a fourth arithmetic unit using the encrypted software and firmware program or information to make the transfer key computation program to generate the transfer key;

the third module sending the encrypted information key to the fourth module; and a fourth decryption unit using the transfer key to decrypt the encrypted information key into an information key, and storing the information key in a fourth storage unit.

4. The protection method for software and firmware or information as claimed in claim 3, wherein the third control unit deletes the encrypted information key of the third storage unit.

* * * * *